(No Model.)  3 Sheets—Sheet 1.

J. M. LINSCOTT.
PISTON WATER METER.

No. 337,845.  Patented Mar. 16, 1886.

WITNESSES:
Chas. H. Kimball.
John P. Kerrigan.

INVENTOR:
John M. Linscott
Per atty
William Henry Clifford (No Model.) 3 Sheets—Sheet 2.
J. M. LINSCOTT.
PISTON WATER METER.

No. 337,845. Patented Mar. 16, 1886.

WITNESSES:
Chas. H. Kimball,
John P. Kernigan,

INVENTOR:
John M. Linscott
Per atty
William Henry Clifford (No Model.) 3 Sheets—Sheet 3.

J. M. LINSCOTT.
PISTON WATER METER.

No. 337,845. Patented Mar. 16, 1886.

WITNESSES:
Chas. H. Kimball.
John P. Kerrigan,

INVENTOR:
John M. Linscott
Per Atty
William Henry Clifford

UNITED STATES PATENT OFFICE.

JOHN M. LINSCOTT, OF LEWISTON, MAINE.

PISTON WATER-METER.

SPECIFICATION forming part of Letters Patent No. 337,845, dated March 16, 1886.

Application filed September 12, 1885. Serial No. 176,870. (No model.)

*To all whom it may concern:*

Be it known that I, JOHN M. LINSCOTT, of Lewiston, in the county of Androscoggin and State of Maine, have invented certain new and useful Improvements in Water-Meters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
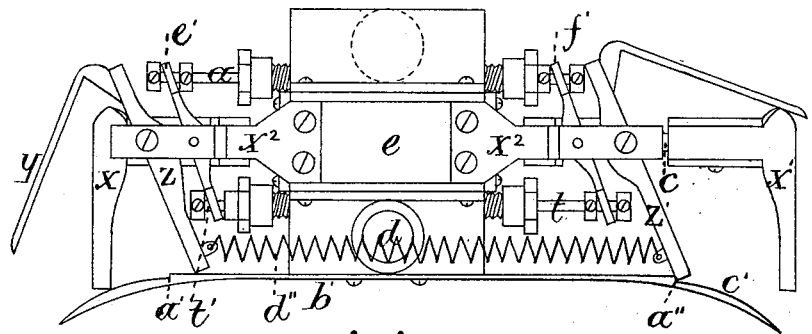
Figure 2:
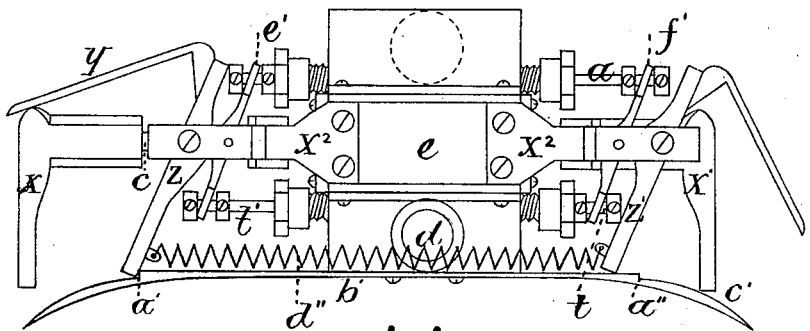
Figure 3:
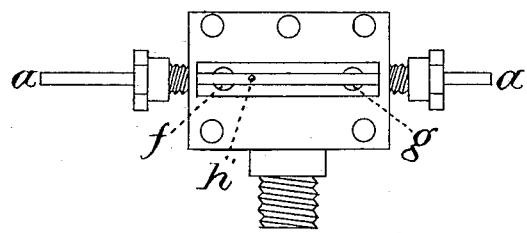
Figure 4:
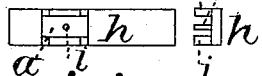
Figure 5:
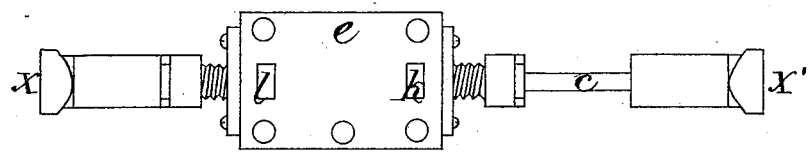
Figure 6:
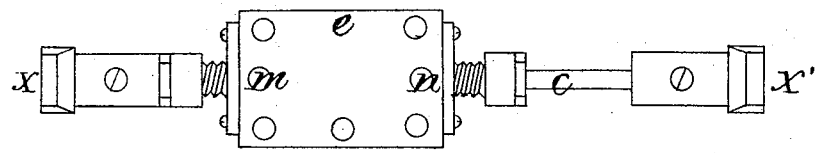
Figure 7:
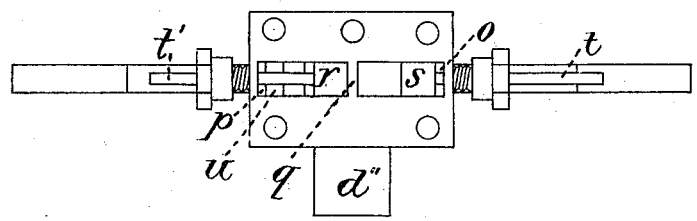
Figure 8:
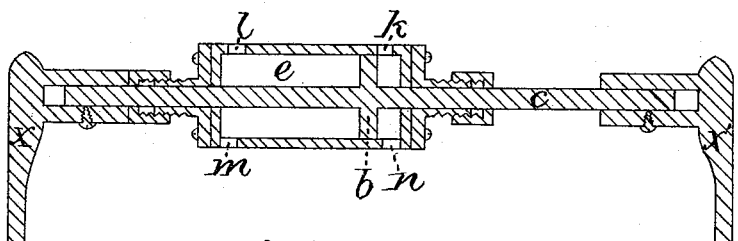
Figure 9:
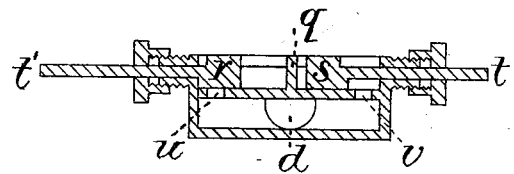

Figure 1 is a side elevation of my invention with the parts in one of the positions produced by its operation. Fig. 2 shows a side elevation illustrating the position of the parts when the valves have been moved to other positions from those seen in Fig. 1. Fig. 3 is a bottom plan of the admission-valve and its seat, which valve is operated by the stem $a$. Fig. 4 is a bottom and end view of the valve that is worked by the stem $a$. Fig. 5 is a top plan of the induction-ports over the meter and over the piston $b$, operated by the rod $c$. Fig. 6 is a bottom view of the same meter, showing the eduction-ports. Fig. 7 is a top plan of the two valves to regulate the outflow of the water after it has passed the meter, Figs. 5 and 6, and for the purpose of discharging it through the nozzle $d$. Fig. 8 is a vertical sectional view through the piston-chamber. Fig. 9 is a sectional view of the outlet-valve chamber.

Same letters show like parts.

My invention relates to water-meters.

The quantity of water is measured in the meter $e$. In this meter or cylinder works the piston $b$ on the rod $c$. Water is admitted into the meter through two ports, $f$ and $g$, which are alternately opened and closed by the valve $h$, worked by the stem $a$. The stem has a hole, $h'$, and the valve $a$ pin, $i$, and two lips, $jj$. The lips $jj$ fit on each side of the stem $a$, and the pin $i$ enters the hole $h'$. Thus the valve is carried with the stem as it moves. If water is first admitted through the port $g$, it then passes into the meter $e$ through the port $k$, and forces the piston $b$ over to the end of the meter, where the port $l$ is, and thus the water flows in and fills the meter $e$. The next motion is of course the entrance of water at the port $f$, the motion of the piston $b$ to the opposite end of the meter or cylinder $e$ and the filling of the meter $e$ through the port $l$. Water issues from the meter $e$ from the ports $m$ and $n$, and enters alternately the chambers $o$ $p$, separated by the partitions $q$, where it works the valves $r$ $s$ on the stem $t$. These valves allow the water to pass alternately through ports $u$ and $v$ to the outflow $d$. The quantity of water is thus indicated by the number of times the meter $e$ is emptied.

The rod $c$ can be used to move any well-known form of indicator to show the number of times the meter has been emptied.

It remains to describe how the different parts or devices of the machine operate. When the water enters the port $g$, the valve $h$ is then over the port $f$, and the machine exhibits the position of the different parts illustrated in Fig. 1. When the parts of the machine are in this position, passage of the water out of the port $n$ of the meter $e$ is prevented by the valve $s$ on the stem $t$, which valve at the same time closes the port $o$, Fig. 7. The valves $r$ and $s$ move in chambers, as seen in Fig. 7, which chambers are divided by the partition $q$. Now, the water entering at the port $k$, Fig. 8, forces the piston $b$ over to the other end of the cylinder from what is illustrated in Fig. 8. This moves the tongue $x$ outwardly so that it strikes the lip $y$ and throws it up, as illustrated in Fig. 2. This moves back the lower end of the lever $z$ until it is caught by the shoulder $a'$ on the plate $b'$. At the same time, when the piston $b$ moves to the other end of the cylinder from that illustrated in Fig. 8, the tongue $x'$ presses down the plate $b'$ by moving up the surface at $c'$. This releases the lever $z'$ from the shoulder $a''$, when it is drawn by the spring $d''$ into the position seen in Fig. 2. When so drawn, the lever $z'$ strikes the end of the stem $t$ and pushes it toward the partition $q$. This, as is apparent, opens the ports $o$ and $n$ and makes ready to allow the water in the meter $e$ to flow down and out of the passage or exit $d$, as illustrated by Fig. 9. The water instantly after the piston $b$ has traveled to the end of the cylinder in Fig. 8, opposite to its position, as there shown, forces the piston back again, thus forcing the water out of the meter $e$ down through the port $n$ and through the port $o$, and out of the machine, as before described.

It remains to describe the operation of the admission-valves and ports seen in Figs. 3, 4, and 5 during the operation of the piston in the meter and the operation of the valves $r$ and $s$ just specified. When the machine is in the operative condition or posture illustrated in Fig. 2, the ports $f$ and $l$ are open for the admission of water, and the piston $b$ is over to the other end of the meter $e$ from the position illustrated in Fig. 8. Thus the water-supply flows in through the ports $f$ and $l$ and throws the piston $b$ back to the position seen in Fig. 8, and so on. The levers $z$ and $z'$ are pivoted between arms $x^2$ extending from the sides of the meter $e$. There are also the two pivoted arms $e'$ $f'$, pivoted to the same arms as levers $z$ $z'$, which serve to throw the stem $a$ in opposite directions to the two stems $t$ and $t'$ when the stem $a$ or $t$ and $t'$ are struck by the levers $z$ and $z'$, as herein described. Thus the water is admitted into the meter $e$, first through the port $l$, and then through the port $k$, or vice versa, as fast as it is allowed to flow out at the exits $v$ or $u$, Fig. 9.

What I claim as my invention, and desire to secure by Letters Patent of the United States, is—

In a water-meter, the combination of the stem $a$, ports $f$ and $g$, valve $h$, stem $c$, piston $b$, ports $m$ and $n$, valves $r$ and $s$, ports $p$ and $o$, stems $t$ and $t'$, exits $u$, $v$, and $d$, with the levers $z$, $z'$, $f'$, and $e$, pivoted as set forth, lips $x$ $x'$, plate $b'$, shoulders $a'$ and $a''$, and spring $d''$, all operating as herein set forth.

In testimony that I claim the foregoing as my own I affix my signature in presence of two witnesses.

JOHN M. LINSCOTT.

Witnesses:
SUMNER HACKETT,
JOHN F. MERRILL.